Aug. 7, 1934.　　　H. A. DE VALLE ARIZPE　　　1,969,296
CALCULATING DEVICE
Filed March 21, 1929　　　2 Sheets-Sheet 1
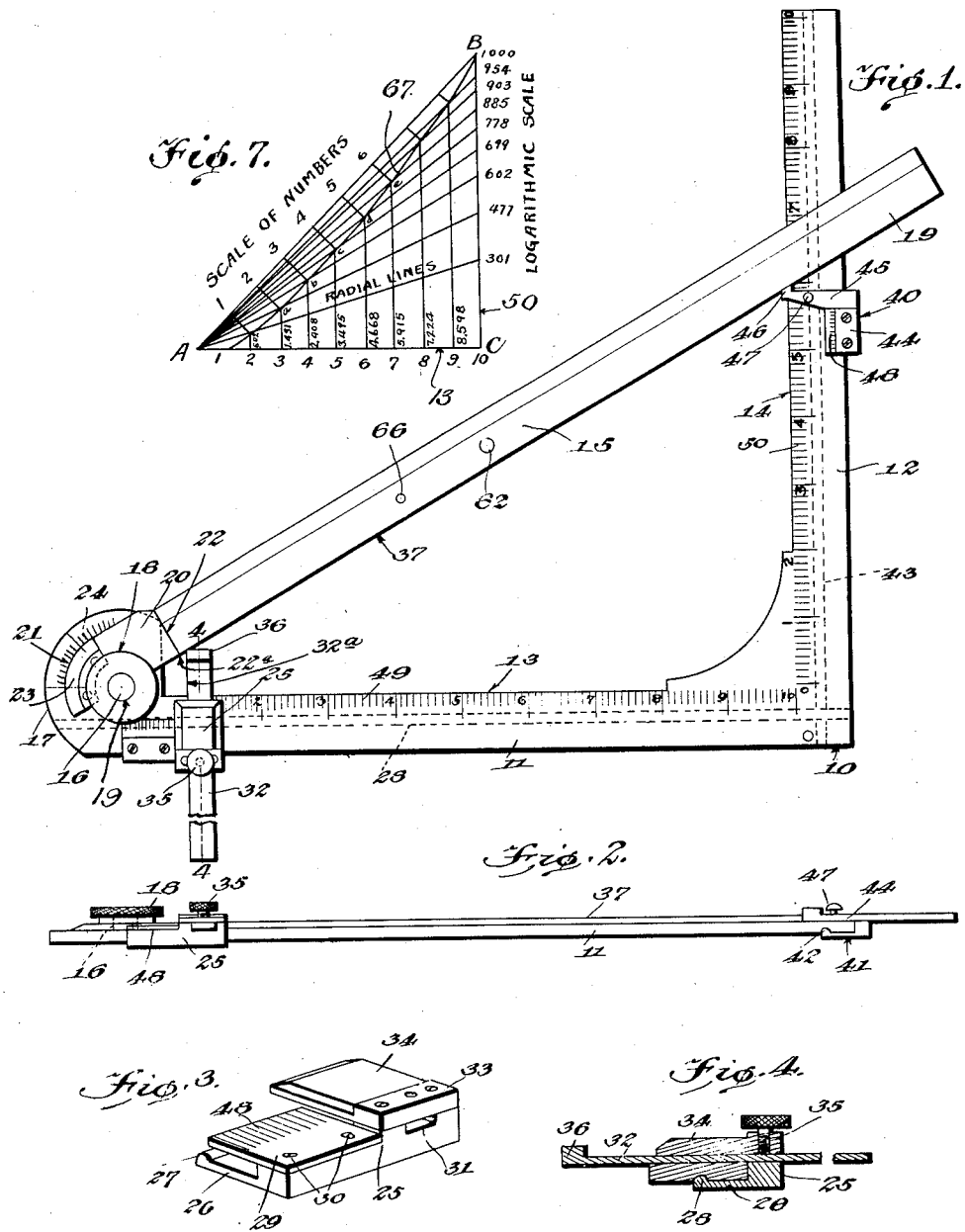
WITNESS
INVENTOR
H.A. DeValle Arizpe.
BY
ATTORNEY Aug. 7, 1934.   H. A. DE VALLE ARIZPE   1,969,296
CALCULATING DEVICE
Filed March 21, 1929   2 Sheets-Sheet 2
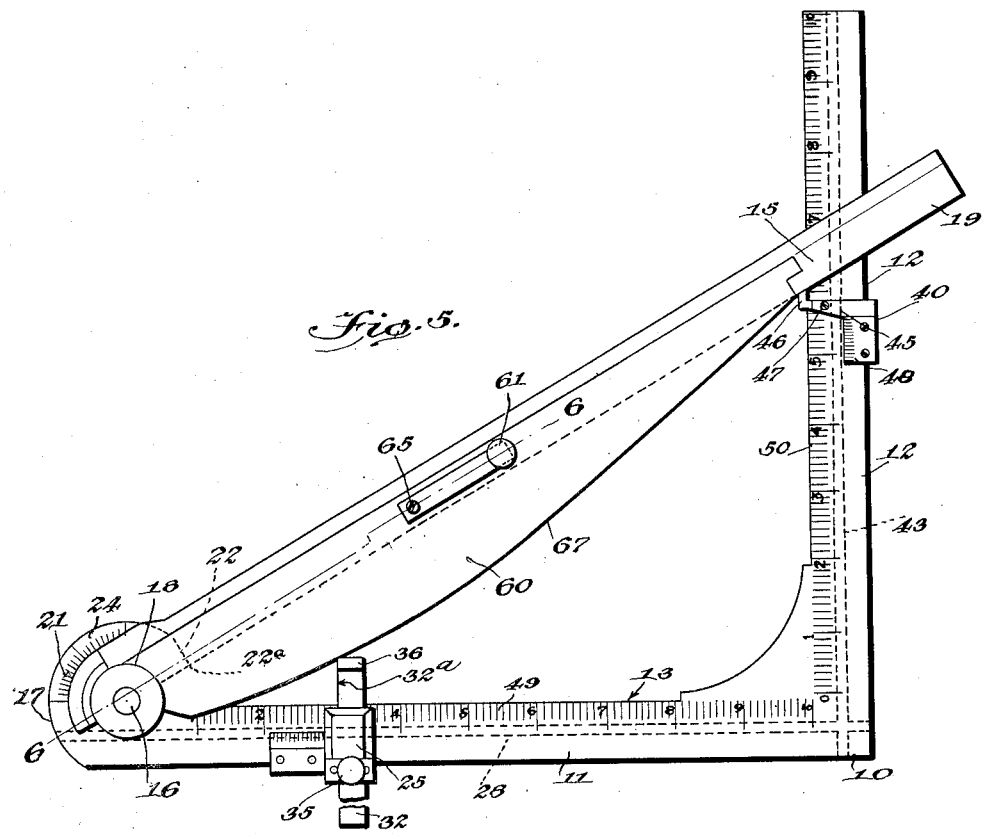
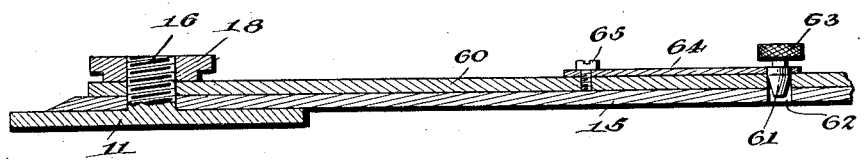
WITNESS
INVENTOR
H. A. DeValle Arizpe,
BY
ATTORNEY Patented Aug. 7, 1934

1,969,296

UNITED STATES PATENT OFFICE 1,969,296

CALCULATING DEVICE

Harmodio A. de Valle Arizpe, Toluca, Mexico

Application March 21, 1929, Serial No. 348,865

2 Claims. (Cl. 235—61)

This invention relates to a calculating device.

An object of the invention is the provision of a device for making calculations involving multiplication, division, proportion, powers, roots, logarithms and the trigonometrical scales.

Another object of the invention is the provision of a simple and accurate device adapted for use in emergency computations in which all the scales employed are universal and equally spaced throughout the entire length making it possible to employ verniers in connection therewith to provide for more accurate readings than any known device where calculations are made by the use of logarithmic scales where divisions of the scales rapidly and constantly diminish in length.

A further object of the invention is the provision of a device in the shape of an angle having an arm with the free end movable over a scale provided on one arm and with a movable slide mounted on the other arm and operating in connection with the movable arm, the movable arm being adapted to carry a curved element which will co-operate with the slide for determining the trigonometrical functions.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of the device constructed in accordance with the principles of my invention, Figure 2 is a front end view of the same, Figure 3 is a view in perspective of the combined vernier and slide movable over one arm of the device, Figure 4 is a vertical section taken along the line 4—4 of Figure 1, Figure 5 is a plan view of a modified form of the invention, and Figure 6 is a section taken along the line 6—6 of Figure 5.

Figure 7 is a diagram showing the method of constructing the curved plate used in Figures 5 and 6.

Referring more particularly to the drawings, 10 designates a right angularly-shaped member forming substantially the framework of the device and includes an arm 11 normally disposed in a horizontal plane and an arm 12 located in a vertical plane. The inner edge of the arm 11 is straight as shown at 13 and the inner edge 14 of the arm 12 is similarly constructed.

A movable arm 15 is pivotally mounted at 16 on an enlargement 17 of the outer end of the arm 11 and is secured in a predetermined position by means of a nut 18 threaded upon the pivot 16. The free end 19 of the arm 15 moves over the face of the arm 12. The inner end of the arm 15 may be embraced by a sleeve 20 formed of metal or the inner end of said arm may be entirely made of metal and have a segmental member 21 secured thereto or formed integrally therewith. The outer end of the plate or sleeve 20 as shown at 22 is formed into a straight edge for a purpose which will be presently explained. The segment 21 is provided with an index 23 which co-operates with a scale 24 on the enlargement 17 for a purpose which will be presently explained. The member 17 is divided by a plurality of indications representing degrees or fractions of degrees.

A slide 25 is mounted on the arm 11 and is substantially U-shaped in cross section. The slide 25 has a flange 26 extending below the arm 11 and has a rib 27 adapted to be received within a groove 28 formed at the underface of the arm 11 for aiding in guiding the slide longitudinally of said arm. A metal plate 29 is secured at 30 to the top of the slide 25 to complete the U-shaped member and this plate rides upon the upper surface of the arm 11. The slide 25 is provided with a groove 31 formed in the body of the slide and located transversely of a flange 26. Located within this groove is a sliding scale member 32 which is held in place by means of a bar 33 secured to the outer face of the slide 25 and a top plate 34. A set screw 35 is threaded into an opening in the bar 33 and is adapted to engage the member 32 for securing the same in position.

The upper free end of the member 32 is provided with a block 36 upon which is adapted to rest the inner edge 37 of the arm 15.

A slide, generally designated by the numeral 40, is mounted on the arm 12 and is provided with a flange 41 having a rib 42 received within a groove 43 located at the underface of the arm 12. A plate 44 is secured to the slide 40 and embraces the outer face of the arm 12. The slide is provided with an extension 45 having a member 46 to receive and support the outer free end 19 of the arm 15. When the slide 40 moves along the arm 12 the inner end of the extension 46 moves in a vertical line which passes through the last division of the scale of the arm 11. A set screw 47 is threaded into a passage in the member 45 for adjusting purposes as will be presently explained. The plate 29 of the slide 25 is provided with a vernier 48 which is adapted to co-operate with the fractions of a scale 49 on the arm 11 in order to obtain smaller fractions of the units indicated on the scale 49. A plate 44 is provided with a vernier 48 which co-operates with the scale 50 on the arm 12 in order to determine smaller fractions of the units indicated by said scale as will be presently explained.

The construction shown in Figures 5 and 6 is substantially identical with that shown in Figures 1 to 4, inclusive, but an additional element, shown at 60, is removably connected to the arm 15. This arm is provided with a socket 62 to receive a lug 61 having a finger-piece 63 adapted to aid in elevating the lug from the socket 62 formed in the arm 15. Said lug is carried at one end of a spring member 64; the other end of the spring member is secured by means of a set screw 65 threaded into a passage in the plate 60. The lug 61 by engagement with the socket aids in maintaining the member 60 in longitudinal alinement with the arm 15.

The member 60 is formed of transparent material and has its inner edge, as shown at 67, curved which is adapted to be engaged by the block or rest 36 of the sliding scale 32. The member 60 extends from the pivot point 16 of the arm 15 to the end of the arm or it may terminate short of said arm, depending upon the computations employed for a purpose which will be presently described. The length of this element must be equal to the length of the scale 49 so that the left side of the block 36 of element 32 may engage all the way through the edge of element 60 while it slides over scale 49. In this case the inner edge alone of the arm 15 likewise is supported by the rest 46 on the slide 40. As the length of the element 60 is equal to that of the scale 49, the inner edge 60 does not reach the rest 46.

I shall refer to the member 60 as the log-curve plate. The extension arm 45 need not be employed in those instruments where the computations are given, namely, in multiplication and division, and where the vertical scale may be placed at any point along the horizontal arm 11. Where trigonometrical functions are being determined the extension arm is quite important because the imaginary line that is traced by the extreme end of the extension arm 45 is always a tangent of the angle that the movable arm makes with the horizontal arm and this tangent is directly read from the vertical scale on the arm 12.

In determining the trigonometrical formulas of angles it will be noted that when the angle formed by the arm 15 and the arm 11 is zero the vertical edge 22ª of the plate 20 coincides with the outer edge of the sliding member 32 and at the same time the zero mark of vernier 48 of slide 25 coincides with the first division point of the scale 49 of the arm 11. The cosine of the angle may be determined readily since it is equal to the distance from the center of the member 16 to the foot of a perpendicular dropped on 13 from the lower end of the edge 22, since the distance from the center of 16 to 22 is equal to unity. This distance falls to the left of the graduation 1 of scale 49 and is measured on scale 48 in conjunction with an index point 99 which is positioned vertically under the center of the pivot 16. The sine of the angle is read on the vertical scale 50 after the outer edge of the member 32 engages the point 22ª. The point 22ª where the member 32 cuts the lower edge of the arm 15 represents a unit distance between the pivotal point of the arm and a point on the scale 49 and is considered in this specification as a sine point.

The operation of my device is as follows: The axis of the screw 16 indicates the zero point of the scale 49 while the zero point of the scale 50 is in a line passing through the axis of the pivot 16 and parallel to the edge 13 of the arm 11.

It is taken for granted in an operating instrument that the usual arm 15 will always be seated on the rest 46 of the extension 45 and that the slide 40 will be made to follow the movements of the arm 15 during its angular movement. During the angular movement of the arm 15 it is understood that the nut 18 is loose.

In order to carry out the process of multiplication the number to be multiplied is located on the vertical scale 50 and the vernier 48 of the slide 25 is aligned with a multiplier on a horizontal scale 49.

The operation of my device is as follows: It is to be understood that the initial graduation is on a line through the center of the pivot 16 and parallel to the edge 13. This line cuts the vertical scale 50 at zero on the arm 12. The application of the device for carrying out the process of multiplication is particularly useful in that one of the multipliers is located on the scale 49 while the other multiplier is located on the scale 50 and the product is finally determined from the last-mentioned scale. The number to be multiplied is located by the slide 40 in connection with the scale 50 and the vernier. The multiplier is found on the scale 49 and zero of vernier 48 of the slide 25 is moved along the arm 11 until it coincides with the numeral which represents the multiplier. The set screw 35 is then loosened and the member 32 is moved to such a position that one edge of the rest or block 32 will engage the edge 37 of the radial arm 15, after said arm has been placed in a position where it will rest upon the seat 46 of the extension arm 45. The slide bar 32 is again clamped in place. The slide 25 is then moved to the left until the zero of vernier 48 of said side coincides with the unit point on the scale 49. The arm 15 is so positioned that it will rest upon the upper edge 36 of the member 32. The number which may be read from the scale 50 as determined by the vernier 48 of slide 40 when the edge 37 of the arm 15 rests upon the extreme point of extension 46 of the slide 40, will be the product.

In working out problems in division by the device the solving of the following problem will exemplify the working of the device: It is desired to divide 6.25 by 2.5 using the device shown in Figure 1. The dividend 6.25 is located on the scale 50 by means of the vernier 48 of the slide 40. In other words, the member 46 is positioned to align with the number 6.25. The slide is then secured in position. The arm 15 is then moved until the edge 37 rests upon the member 46 so that a triangle is formed having its sides represented by the edges 13, 14 and 37. The set screw 35 is loosened and the slide 25 is moved to the left until the edge 32ª of the member 32 aligns with the unit point of the scale 49 and the member 32 is elevated until the member 36 engages the edge 37 of the member 15 whence the set screw 35 is turned until the member 32 is secured in place.

The slide 25 is then moved to the right until the edge 32ª of the member 32 aligns with the 2.5 division on the scale 49. In other words, the edge 32ª must align with a point which is half way between the numerals 2 and 3 of the scale 49.

The slide 40 is then released and moved downwardly and the arm 15 is likewise moved downwardly until the edge 37 of the member 15 again engages the top of the member 36. The slide 40 may be moved so that the member 46 will engage the edge 37 of the member 15 and the computation 2.5 will be found on the scale 50 at a point where the edge 37 of the member 15 cuts the scale 50. The exact computation on the number on the scale can be determined by the vernier 48 of the slide 40.

Thus it will be found that the dividend is determined on the scale 50, the divisor on the scale 49, while the quotient is found on the scale 50 in the manner described above.

In those complex problems in multiplication and division and problems in ratio or proportion in which the following equation is representative $$\frac{a \times b}{c} = d$$

and where $d$ is the unknown factor, the numerical value of $a$ is indicated on the scale 50 by the slide 40 while the numerical value of $b$ is found on the scale 49. The slide 25 is then moved so that it will indicate numerically the value of $b$ and the member 32 is moved upwardly until the head 26 engages the edge 37 and is then locked in place by the set screw 35. The slide 25 is then moved to the right or left of this position until it coincides with the numerical value of the divisor $c$. The result is indicated on the scale 50 where the zero of vernier 48 of slide 40 cuts the said scale, after said arm has been moved into engagement with the rest 36 of the member 32 and at the same time rests upon the edge 46 of the extension arm 45.

Where it is desired to determine several quotients which are to be obtained by dividing one number by different numbers the dividend is found on scale 50 and the arm 15 is moved to such a position where the edge 37 in connection with the slide 40 will cut the division on scale 50 indicating such number or dividend. The slide 25 is then moved so that the zero of its vernier 48 will align with unity on the scale 49 and the movable member 32 is set in position with the block 36 against the edge 37 and locked by the set screw 35. It is then moved to the right over the scale 49 so that the zero of vernier 48 of slide 25 will align with the different divisors while permitting the arm 15 to move downwardly after the slide 25 is moved to the right. As the various numerical values of the divisors are reached on the scale 49, the edge 37 in connection with a vernier 48 of slide 40 will indicate on the scale 50 the various quotients to be determined.

A similar method is employed in order to determine the diameter of the circle when the circumference of the circle is given from the formula:

Diameter of circle:113::Circumference of circle:355. In order to determine the diameter of a circle in this manner, a number 113 is located on the scale 50 by the slide 40 and the arm 15 will be moved so that it will rest upon the member 46. The slide 25 is then moved so that the member 32 will align with the numeral on the scale 49 which represents the circumference of a circle. The movable scale 32 is moved upwardly if necessary until the rest 36 engages the edge 37 of the arm 15. The slide is then moved to a point where the member 32 will align with the number 355. The arm 15 is then positioned so that it will engage the rest 36 and the numeral or fraction of the scale 50 which is determined by the edge 37 of the arm 15 represents the diameter of the circle.

Referring more particularly to Figure 7 it will be seen that a right triangle is shown having the vertical side B C divided into a thousand parts with a portion of a logarithmic scale disclosed along this line. The base A C of the triangle is divided into ten equal parts and these parts are numbered from 1 to 9, inclusive. A radial line is drawn from A cutting the side B C at 301. Other radial lines are drawn from the vertex A cutting the line B C at the indicated numerical heights on the line B C.

Reference to a logarithmic scale will show that the logarithm of 2 is .301; the logarithm of 3 is .477; the logarithms of 4 and 5 are, respectively, .602 and .699.

From the tenths divisions of the line A C are drawn verticals perpendicularly to the line A C at the points 2, 3, 4, etc. These perpendiculars cut the radial lines at points $a$, $b$, $c$, $d$, etc. A curved line is drawn through these points and this curved line represents the edge 67 of the plate 60. It will be seen from the diagram and the device shown in Fig. 5 that when the lower edge of the member 15 is supported at indication 10 on the scale 50, the angle formed by the member 15 with the edge 13 of the arm 11 will be 45°. The edge 67 of the member 60 will be in the position shown by the curved line $a$, $b$, $c$, $d$, etc., in Figure 7.

The lines $3a$, $4b$, $5c$, etc. can be measured or they may be computed by proportion. The proportions in this instance are obtained on the theory that the sides of similar triangles are proportional.

When it is desired to find the logarithm of a number, such as 3, by the device shown in Fig. 5, the arm 15 is raised as is the slide 40 until the upper end of the member 46 aligns with the ten point on the arm 12 and the slide 40 is then fastened in position to maintain the arm in such position. The slide 25 is moved along the arm 11 until the edge 32ª of the member 32 aligns with the division mark represented by the numeral 3 on the scale 49. The screw 35 is then loosened and the member 32 is adjusted until the top of the member 36 engages the edge 67 of the plate 60. The screw 35 is then tightened to hold the member 32 in position. The plate 60 is then moved out of the way from the arm 15 so that it will be possible for the lower edge of the arm 15 to engage the member 36. The slide 40 is then released and lowered upon the arm 12 and the arm 15 is then moved downwardly to engage the upper edge of the member 36. The arm 15 is thus supported by the upper edge of the member 36 and the slide 40 may be moved to a position where the member 36 will engage the lower edge of the arm 15 and the slide may be fixed in position.

It will be seen that the lower edge of the arm 15 will cut the scale 50 at a point indicated by the numeral 477 and by placing the decimal before the 4 of this numeral, the decimal fraction thus obtained will be the logarithm of the numeral 3.

An inspection of Figure 7 will show that this is the proper calculation since the point on the curved line indicated by the letter $a$ is at the junction where the curved line cuts the radial line Aa. The line Aa is represented by the lower edge of the arm 15 while the perpendicular line 3a is represented by the edge 32ª of the member 32 and the height of this line is represented by the distance between the top edge of the member 36 and the edge 13 of the scale 49 on the member 32. The vernier on the slide 25 will show that the height in the units employed will be 1.431. Any other number may be calculated in a similar manner.

In order to find the tangent of an angle the member 60 is removed so that a device similar to Figs. 1 to 4, inclusive, is employed. The arm 15 is moved regularly until the vernier 23 and the quadrant 24 will indicate the value of the angle whose tangent is to be determined. The tangent is read directly from the scale 50 by means of vernier 48 of slide 40 when the edge of the extension arm 45 is under the edge 37 of the arm 15. In order to find the sine of an angle the arm 15 is moved so that the given angle will be designated on the vernier 23 and quadrant 24. The member 25 is moved to the left until the upper left-hand edge 32ª of said member will engage the lower edge 22ª of the arm 15 and the set screw 35 is tightened for maintaining the member 32 in position. The slide 25 is then moved to a position where the left edge 32ª of the member 32 will align with the unit of the scale 49. The sine of the angle is then found on the scale 50 and at a point where the edge 37 of the arm 15 cuts said scale.

The cosine of the angle may be determined after the arm 15 has been set at the true angle for which the cosine is to be found. The side 25 is moved to the right until the edge 32ª of the member 32 aligns with the point indicated by the numeral 22ª and the distance between zero and the point on scale 49 where the edge 32ª cuts the scale 49 represents the cosine of the angle.

I claim:

1. A device of the character described comprising an arm provided with a scale, a second arm secured at a right angle to the first arm and also provided with a scale, a radial arm pivotally mounted on one end of the first arm and having the free end movable over the scale of the second arm, a slide movable over the first arm and provided with a movable member adapted to engage the radial arm and for predeterminedly positioning said arm for disclosing the numerical relationship between the scales of the other arms, a plate carried by the radial arm and having a curved edge engageable with the end of the movable member of the slide for determining the angular position of the radial arm, the curved edge of the plate representing a logarithmic curve.

2. A device of the character described comprising an arm provided with a scale, a second arm secured at a right angle to the first arm and also provided with a scale, a radial arm pivotally mounted on one end of the first arm and having the free end movable over the scale of the second arm, a slide movable over the first arm and provided with a movable member adapted to engage the radial arm and for predeterminedly positioning said arm for disclosing the numerical relationship between the scales of the other arms, a plate carried by the radial arm and having a curved edge engageable with the end of the movable member of the slide for determining the angular position of the radial arm, a slide mounted on the second arm for indicating the numerical value of the portion of the second scale cut off by the radial arm, the curved edge of the plate defining a logarithmic curve.

HARMODIO A. DE VALLE ARIZPE.